(12) United States Patent
Su et al.

(10) Patent No.: US 12,255,742 B2
(45) Date of Patent: Mar. 18, 2025

(54) INFORMATION TRANSMISSION METHOD AND DEVICE

(71) Applicant: DATANG MOBILE COMMUNICATIONS EQUIPMENT CO., LTD., Beijing (CN)

(72) Inventors: Xin Su, Beijing (CN); Qiubin Gao, Beijing (CN); Mengjun Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 443 days.

(21) Appl. No.: 17/637,781

(22) PCT Filed: Jun. 16, 2020

(86) PCT No.: PCT/CN2020/096423
§ 371 (c)(1),
(2) Date: Feb. 23, 2022

(87) PCT Pub. No.: WO2021/036423
PCT Pub. Date: Mar. 4, 2021

(65) Prior Publication Data
US 2022/0321274 A1    Oct. 6, 2022

(30) Foreign Application Priority Data
Aug. 23, 2019 (CN) .......................... 201910785612.9

(51) Int. Cl.
*H04L 1/1812* (2023.01)
*H04L 5/00* (2006.01)
*H04W 72/1268* (2023.01)

(52) U.S. Cl.
CPC .......... *H04L 1/1812* (2013.01); *H04L 5/0055* (2013.01); *H04W 72/1268* (2013.01)

(58) Field of Classification Search
CPC ... H04L 1/1812; H04L 5/0055; H04L 1/1861; H04L 1/1896; H04L 1/1854;
(Continued)

(56) References Cited

U.S. PATENT DOCUMENTS 9,608,910 B2    3/2017    Han et al.
9,706,532 B2    7/2017    Wang et al.
(Continued)

FOREIGN PATENT DOCUMENTS

| CN | 104767593 A | 7/2015 |
| CN | 108271262 A | 7/2018 |
| CN | 109391404 A | 2/2019 |

OTHER PUBLICATIONS

Intel Corporation, "Enhancements to HARQ for NR-unlicensed", 3GPP TSG RAN WG1 Meeting #96bis, Xi'an, China, Apr. 8-12, 2019, total 12 pages, R1-1904287.
(Continued)

*Primary Examiner* — Ayanah S George
(74) *Attorney, Agent, or Firm* — Kilpatrick Townsend & Stockton LLP

(57) ABSTRACT

Disclosed are an information transmission method and device. On the terminal side, an information transmission method provided by the embodiment of the present application, includes: determining the actual reporting method of the physical uplink control channel PUCCH according to the reported time domain resources and higher-layer configuration, the actual reporting method is joint reporting or independent reporting; where, the higher-layer configuration includes indication information of the PUCCH reporting method configured on the network side; using the reporting method to transmit PUCCH, the PUCCH carries HARQ feedback information.

12 Claims, 2 Drawing Sheets

(58) Field of Classification Search
CPC ............ H04L 1/1607; H04W 72/1268; H04W 72/21; H04W 72/0446; H04W 72/232
See application file for complete search history.

(56) References Cited

U.S. PATENT DOCUMENTS

| | | | |
|---|---|---|---|
| 2012/0327916 | A1 | 12/2012 | Ahn et al. |
| 2019/0103943 | A1 | 4/2019 | Wang et al. |
| 2021/0014883 | A1* | 1/2021 | Khoshnevisan ...... H04W 72/23 |
| 2021/0266946 | A1* | 8/2021 | Li .................... H04L 5/0055 |
| 2022/0150942 | A1* | 5/2022 | Xu .................... H04W 72/21 |
| 2022/0183024 | A1* | 6/2022 | Andersson ........ H04W 72/1273 |
| 2022/0407631 | A1* | 12/2022 | El Hamss ............. H04L 1/1861 |

OTHER PUBLICATIONS

Zte et al.,"HARQ timing and resource of PUCCH",3GPP TSG-RAN WG1 Meeting #87, Reno, USA Nov. 14-18, 2016, total 4 pages, R1-1611290.

Huawei et al.,"Clarification on HARQ-ACK codebook and PUCCH resource determination", 3GPP TSG RAN WG1 Meeting #96, Athens, Greece, Feb. 25-Mar. 1, 2019, total 3 pages, R1-1903206.

Panasonic,"On multi-TRP enhancements for NR MIMO in Rel. 16", 3GPP TSG RAN WG1 #96bis, Xi'an, China, Apr. 8-12, 2019, total 13 pages, R1-1904190.

Qualcomm Incorporated,"Multi-TRP Enhancements", 3GPP TSG-RAN WG1 Meeting #97, May 13-17, 2019, Reno, Nevada, USA, total 25 pages, R1-1907289.

Huawei et al.,"HARQ enhancements in NR unlicensed", 3GPP TSG RAN WG1 Meeting #95, Spokane, USA, Nov. 12-16, 2018, total 13 pages, R1-1812196.

Korean Intellectual Property Office, Office Action Issued in Application No. 10-2022-7008205, Jun. 3, 2024, 5 pages.

Qualcomm Incorporated, "Multi-TRP Enhancements", 3GPP TSG-RAN WG1 Meeting #98, Aug. 26-30, 2019, Prague, Czech Republic, total 32 pages, R1-1909272.

Nokia et al., "Enhancements on Multi-TRP/Panel Transmission", 3GPP TSG RAN WG1 #98 Meeting, Prague, CZ, May 26-Aug. 30, 2019, total 29 pages, R1-1909209.

Korean Intellectual Property Office, Notice of Allowance Issued in Application No. 10-2022-7008205, Jan. 11, 2025, 2 pages.

* cited by examiner

INFORMATION TRANSMISSION METHOD AND DEVICE

CROSS REFERENCE TO RELATED APPLICATIONS

The present application is a US National Stage of International Application No. PCT/CN2020/096423, filed on Jun. 16, 2020, which claims priority to Chinese Patent Application No. 201910785612.9, entitled "INFORMATION COMMUNICATION METHOD AND APPARATUS", and filed to the China Patent Office on Aug. 23, 2019, the entire contents of which are incorporated herein by reference.

FIELD

The present application relates to the field of communication, in particular to an information communication method and apparatus.

BACKGROUND

In order to improve the coverage at the edge of a cell and provide a more balanced quality of service in a service area, multi-point coordination is still an important means in a new radio (NR) system. From the perspective of network morphology, network deployment with a large quantity of distributed access points and base band centralized processing will be more conductive to providing a balanced user experience rate, and significantly reduce the delay and signaling overhead caused by hand-off. With the increase of frequency bands, relatively dense deployment of access points is also required from the perspective of ensuring network coverage. In a high frequency band, with the improvement of the integration of an active antenna device, a modular active antenna array will be more preferred. The antenna array of each transmission reception point (TRP) can be divided into several relatively independent antenna panels, so the shape and port quantity of the whole array can be flexibly adjusted according to the deployment scenario and service requirements. The antenna panels or TRPs can also be connected by optical fibers for more flexible distributed deployment. In a millimeter wave band, with the decrease of wavelength, the blocking effect caused by obstacles such as human bodies or vehicles will be more significant. In this case, from the perspective of ensuring the robustness of link connection, the cooperation between multiple TRPs or panels can also be used to transmit/receive multiple beams from multiple angles, to reduce the adverse impact caused by the blocking effect.

In the multi-point cooperative transmission of multiple downlink control information (DCI) scheduling multiple physical downlink shared channels (PDSCHs), there is no clear solution to the specific reporting mode of physical uplink control channel (PUCCH) reporting.

SUMMARY

The embodiments of the present application provide an information communication method and apparatus, which are used to determine a PUCCH reporting mode is joint reporting or independent reporting according to time domain resources and higher-layer configuration, and transmit a PUCCH by using the determined reporting mode.

At a terminal side, the embodiments of the present application provide an information communication method, including:

determining an actual reporting mode of a PUCCH according to a reported time domain resource and higher-layer configuration, where the actual reporting mode is a joint reporting mode or an independent reporting mode, and the higher-layer configuration includes indication information of a PUCCH reporting mode configured by a network side; and transmitting the PUCCH according to reporting mode, where the PUCCH carries hybrid automatic repeat request (HARQ) feedback information.

Through the method, the actual reporting mode of the PUCCH is determined according to the reported time domain resource and the higher-layer configuration, and the actual reporting mode is joint reporting or independent reporting; and the PUCCH is transmitted by using the reporting mode, so, whether the PUCCH reporting mode is joint reporting or independent reporting is determined according to the time domain resource and the higher-layer configuration jointly, the PUCCH is transmitted by using the determined reporting mode, and the HARQ feedback information is reported to the network side.

In one embodiment, the determining the actual reporting mode of the PUCCH according to the reported time domain resource and the higher-layer configuration, includes:

in a case that the network side configures the PUCCH reporting mode as joint reporting, and indicates the HARQ feedback information is reported through the PUCCH on a same time domain resource for multiple PDSCHs, reporting the HARQ feedback information through the PUCCH on the same time domain resource by using the joint reporting mode.

In one embodiment, in a process of reporting the HARQ feedback information through the PUCCH by using the joint reporting mode, the method further includes:

cascading two codebooks, or combining two codebooks in an interleaving mode in a case of determining a joint codebook; and in a case that a higher layer configures two higher-layer configuration identifiers (H-IDs) with different values, determining a feedback order of the HARQ feedback information by using the H-IDs; where the HARQ feedback information is HARQ feedback information of the PDSCH scheduled by a control resource set (CORESET), and the H-IDs are identifiers configured by the higher layer for the CORESET scheduling the PDSCH.

In one embodiment, in a case that the higher layer configures two H-IDs with a same value, or does not configure an H-ID, a feedback order of the HARQ feedback information is determined by adopting one of:

mode 1: determining the feedback order of the HARQ feedback information according to a size of a CORESET identifier (ID) corresponding to DCI;

mode 2: determining the feedback order of the HARQ feedback information according to an instruction in the DCI; or mode 3: determining, for the interleaving mode, the feedback order of the HARQ feedback information according to a time when the DCI is detected.

In one embodiment, in a case that the higher layer configures two H-IDs with a same value, or does not configure an H-ID, then:

the HARQ feedback information is reported according to a PUCCH resource indicated by last DCI sent in a case that sending times of respective DCI are different; or a PUCCH resource indicated in one piece of DCI is determined according to a size of a CORESET ID to report the HARQ feedback information in a case that sending times of respective DCI are identical.

In one embodiment, the determining the actual reporting mode of the PUCCH according to the reported time domain resource and the higher-layer configuration, includes:

in a case that the network side configures the PUCCH reporting mode as joint reporting, and indicates the HARQ feedback information is reported through the PUCCH on different time domain resources for PDSCHs, independently generating and reporting a codebook for each of the PDSCHs according to a codebook generation mode of the HARQ feedback information.

The embodiments of the present application provide an information communication apparatus, including:

a memory, configured to store program instructions; and a processor, configured to call the program instructions stored in the memory and execute according to obtained programs:

determining an actual reporting mode of a PUCCH according to a reported time domain resource and higher-layer configuration, where the actual reporting mode is a joint reporting mode or an independent reporting mode, and the higher-layer configuration includes indication information of a PUCCH reporting mode configured by a network side; and transmitting the PUCCH according to the reporting mode, where the PUCCH carries HARQ feedback information.

In one embodiment, the processor is configured to execute:

in a case that the network side configures the PUCCH reporting mode as joint reporting, and indicates the HARQ feedback information is reported through the PUCCH on a same time domain resource for multiple PDSCHs, reporting the HARQ feedback information through the PUCCH on the same time domain resource by using the joint reporting mode.

In one embodiment, in a process of reporting the HARQ feedback information through the PUCCH by using the joint reporting mode, the processor is configured to execute:

cascading two codebooks, or combining two codebooks in an interleaving mode in a case of determining a joint codebook; and in a case that a higher layer configures two H-IDs with different values, determining a feedback order of the HARQ feedback information by using the H-IDs; where the HARQ feedback information is HARQ feedback information of the PDSCH scheduled by a CORESET, and the H-IDs are identifiers configured by the higher layer for the CORESET scheduling the PDSCH.

In one embodiment, in a case that the higher layer configures two H-IDs with the same value, or does not configure an H-IDs, a feedback order of the HARQ feedback information is determined by adopting one of:

mode 1: determining the feedback order of the HARQ feedback information according to a size of a CORESET ID corresponding to DCI;

mode 2: determining the feedback order of the HARQ feedback information according to an instruction in the DCI; or mode 3: determining, for the interleaving mode, the feedback order of the HARQ feedback information according to a time when the DCI is detected.

In one embodiment, in a case that the higher layer configures two H-IDs with the same value, or does not configure an H-ID, the processor is configured to execute the following:

the HARQ feedback information is reported according to a PUCCH resource indicated by last DCI sent in a case that sending times of respective DCI are different; or a PUCCH resource indicated in one piece of DCI is determined according to a size of a CORESET ID to report the HARQ feedback information in a case that sending times of respective DCI are identical.

In one embodiment, the processor is configured to execute:

in a case that the network side configures the PUCCH reporting mode as joint reporting, and indicates the HARQ feedback information is reported through the PUCCH on different time domain resources for PDSCHs, independently generating and reporting a codebook for each of the PDSCHs according to a codebook generation mode of the HARQ feedback information.

The embodiments of the present application provide another information communication apparatus, including:

a first device, configured to determine an actual reporting mode of a PUCCH according to a reported time domain resource and higher-layer configuration, where the actual reporting mode is a joint reporting mode or an independent reporting mode, and the higher-layer configuration includes indication information of a PUCCH reporting mode configured at a network side; and a second device, configured to transmit the PUCCH through the reporting mode, where the PUCCH carries HARQ feedback information.

Another embodiment of the present application provides a computing device, including a memory and a processor, where the memory is configured to store program instructions, and the processor is configured to call the program instructions stored in the memory and execute any of the above methods according to the obtained programs.

Another embodiment of the present application provides a computer storage medium, the computer storage medium stores computer executable instructions which are configured to enable a computer to execute any of the above methods.

BRIEF DESCRIPTION OF THE DRAWINGS

In order to more clearly illustrate the embodiments of the present application, the following will briefly introduce the drawings needed in the description of the embodiments, the drawings in the following description are only some embodiments of the present application.

DETAILED DESCRIPTION OF THE EMBODIMENTS

Figure 1:
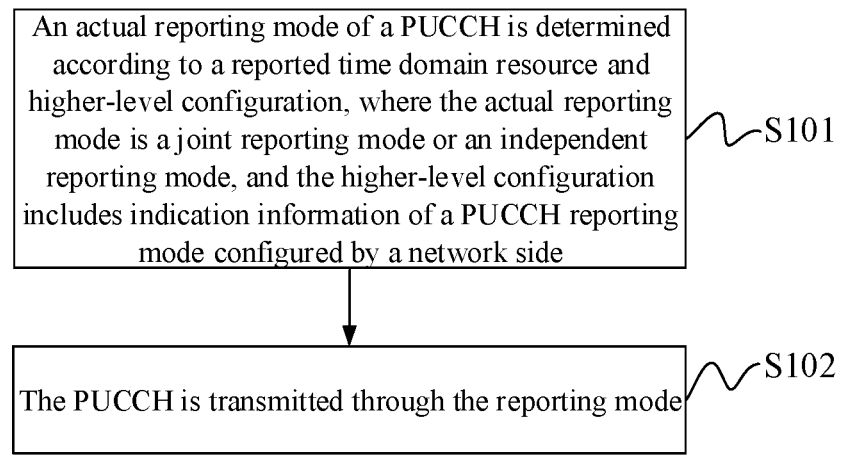
FIG. 1 is a flow chart of an information communication method provided by embodiments of the present application.

The embodiments of the present application will be clearly and completely described below with reference to the drawings in the embodiments of the present application, the described embodiments are only a part of the embodiments of the present application, not all of the embodiments.

At present, multi-TRP/panels support two transmission types, namely single DCI scheduling and multiple DCI scheduling.

The single DCI scheduling: scheduling a PDSCH through a physical downlink control channel (PDCCH).

The multiple DCI scheduling: respectively scheduling one PDSCH through two PDCCHs.

When multiple pieces of the DCI are used for scheduling, multiple PUCCHs may be used to report respectively, or one PUCCH may be used for joint reporting. When independent reporting is performed through the multiple PUCCHs, codebooks for reporting need to be generated respectively; and when joint reporting is performed through one PUCCH, it is necessary to determine how to generate a joint codebook. At present, a higher layer may configure corresponding ID (H-ID for short) for a control resource set (CORESET) that schedules the PDSCH. It should be noted that the ID is different from the CORESET ID (C-ID for short). When independent codebooks are generated, values of the two C-IDs are different, and the scheduled PDSCHs respectively correspond to an independent codebook.

The codebook here refers to the arrangement of bits of HARQ feedback information (the feedback information includes: ACKnowledge (ACK)/negative ACKnowledge (NACK), and ACK/NACK is referred to as AN) when reporting through the PUCCH. That is, according to the structure of the codebook, a terminal needs to sort and report the AN bit corresponding to data at each PDSCH transmission moment on each component carrier (CC) that needs to be reported on the same slot.

TABLE 1

Examples of structures of the codebooks

|  | Slot 1 | Slot 2 |
| --- | --- | --- |
| CC1 | AN of PDSCH 1(1,2) | AN of PDSCH 3(3,5) |
| CC2 | AN of PDSCH 2(2,2) | AN of PDSCH 4(4,5) |
| CC3 |  | AN of PDSCH 5(5,5) |
| DAI (cDAI, tDAI ) |  |  |

A downlink assignment index (DAI) in Table 1 is indicated by the DCI, where cDAI represents the serial number of data sent on the slot. For example, there are scheduled data on CC1 and CC2 on slot 1 in Table 1, and their cDAIs are 1 and 2 respectively. tDAI indicates the total quantity of scheduled data up to the slot. For example, the total quantity of data scheduled by all CCs on the slot 1 in Table 1 is 2, so tDAI=2. The terminal acquires the above codebook through the DCI, and for the corresponding PDSCH in the codebook, AN information on the same slot needs to be reported. Therefore, the terminal can arrange the corresponding AN bits of each PDSCH together according to the order of the AN bits determined in the codebook and report through the PUCCH.

If the joint reporting mode is adopted, the two codebooks may be cascaded, or a joint codebook may be synthesized in an interleaving mode. The so-called cascade mode means that the order of the AN bit is determined according to the respective codebook, then the order of the AN bit for a certain TRP is arranged first, and the order of the AN bit for another TRP is arranged behind. The interleaving mode means that the PDSCHs with the same CC and the same transmission slot are arranged in a preset order. For example, Table 2 shows an example of the joint codebook generated by the interleaving mode.

TABLE 2

Examples of forming the joint codebook in the interleaving mode

|  | Slot 1 | Slot 2 |
| --- | --- | --- |
| CC 1 | AN of PDSCH 1 from TRP0(1,2) | AN of PDSCH 3 from TRP0 (3,5) |
|  | AN of PDSCH 1 from TRP1(1,1) | AN of PDSCH 2 from TRP1 (1,3) |
| CC2 | AN of PDSCH 2 from TRP0 (2,2) | AN of PDSCH 4 from TRP0 (4,5) |
|  |  | AN of PDSCH 3 from TRP1 (2,3) |
| CC3 |  | AN of PDSCH 5 from TRP0 (5,5) |
| DAI (cDAI, tDAI) |  |  |

When a resource used for PUCCH transmission is determined, the last piece of DCI received by the terminal shall prevail. That is to say, if the terminal receives scheduling information of the multiple PDSCHs, the HARQ feedback for these PDSCHs is performed on the same time domain resource, then the resource used for HARQ feedback on the above time domain resource is indicated by the last piece of DCI received by UE among DCI that schedules these PDSCHs.

However, in the existing multi-point cooperative transmission of multiple DCI scheduling multiple PDSCHs, the PUCCH reporting has the following problems without clear solutions:

how to switch between the joint reporting and the independent reporting: that is, under what circumstances, what mechanism is used to switch; and during joint reporting, how to determine the order of the AN information reported by each TRP.

During joint reporting, if the terminal receives scheduling information of multiple PDSCHs (corresponding to different pieces of DCI), the HARQ feedback for these PDSCHs is performed on the same time domain resource, and the sending times of the last few pieces of DCI are the same, then the terminal cannot distinguish which DCI is the last piece of DCI, and consequently, the resource used by the PUCCH cannot be determined.

Therefore, the embodiments of the present application provide a method and apparatus for reporting by using the PUCCH when multi-TRP/panels are used for cooperative transmission.

The method and the apparatus are based on the same application concept. Since the method and the apparatus have similar principles for solving the problems, the implementation of the apparatus and the method can be referred to each other, and the repetition will not be repeated.

The embodiments of the present application can be applied to various systems, especially a 5G system. For example, the applicable system may be a global system of mobile communication (GSM), a code division multiple access (CDMA) system, a wideband code division multiple access (WCDMA) general packet radio service (GPRS) system, a long term evolution (LTE) system, an LTE frequency division duplex (FDD) system, LTE time division duplex (TDD), a universal mobile telecommunication system (UMTS), a worldwide interoperability for microwave access (WiMAX) system, the 5G system, a 5G NR system, etc. These systems all include a terminal device and a network device.

The terminal device involved in the embodiments of the present application may be a device that provides voice and/or data connectivity to a user, a handheld device with a wireless connection function, or other processing devices connected to a wireless modem. In different systems, the name of the terminal device may be different, for example, in the 5G system, the terminal device may be referred to as user equipment (UE). The wireless terminal device may communicate with one or more core networks via the radio access network (RAN), the wireless terminal device may be a mobile terminal device, such as a mobile phone (or called a "cellular" phone) and a computer with the mobile terminal device, for example, it may be a portable, pocket, handheld, computer-built-in or vehicle-mounted mobile device that exchange language and/or data with a wireless access network. For example, a personal communication service (PCS) phone, a cordless phone, a session initiated protocol (SIP) phone, a wireless local loop (WLL) station, a personal digital assistant (PDA) and other devices. The wireless terminal device may also be called as a system, a subscriber device, a subscriber station, a mobile station, a mobile, a remote station, an access point, a remote terminal, an access terminal, a user terminal, a user agent and a user device, which are not limited in the embodiments of the present application.

The network device involved in the embodiments of the present application may be a base station, and the base station may include cells. Based on different specific application scenarios, the base station may also be referred to as an access point, or may refer to a device that communicates with wireless terminal device through one or more sectors on an air interface in an access network, or other names. The network device may be used to convert the received air frame and Internet protocol (IP) packet to each other, as a router between the wireless terminal device and the rest of the access network, where the rest of the access network may include an IP communication network. The network device may also coordinate the attribute management of the air interface. For example, the network device involved in the embodiments of the present application may be a base transceiver station (BTS) in a GSM or CDMA, a NodeB in WCDMA, an evolutional node B (eNB or e-NodeB) in an LTE system, a 5G station in a 5G network architecture (a next generation system), a home evolved node B (HeNB), a relay node, a femto, or a pico, etc., which are not limited in the embodiments of the present application.

Hereinafter, each embodiment of the present application will be described in detail with reference to the accompanying drawings of the specification. It should be noted that the display order of the embodiments of the present application only represents the sequential order of the embodiments, and does not represent the pros and cons of the embodiments.

In the embodiments of the present application, a terminal may jointly determine whether to use a joint reporting mode or an independent reporting mode to report HARQ feedback information according to higher-layer configuration and time domain resources. The terminal determines the reporting mode according to the higher-layer configuration at the network side and the time domain resources, and reports the HARQ feedback information by using the determined reporting mode.

For example, if the network side indicates multiple PDSCHs to report the HARQ feedback information through the PUCCH on the same time domain resource (which may be slots or sub-slots), the AN is reported through the PUCCH by using the joint reporting mode on the above time domain resource; and if the network side indicates each PDSCH to report the AN through the PUCCH on different time domain resources, codebooks are independently generated and reported for each PDSCH according to the AN codebook generation mode of existing version Rel-15, that is, the HARQ feedback information AN is transmitted by using the independent reporting mode.

The specific transmission process of the HARQ feedback information includes, for example: the network side configures the reporting mode of the terminal as joint reporting or independent reporting through control signaling.

1. If the reporting mode configured at the network side is joint reporting, then: if the network side indicates multiple PDSCHs to report the HARQ feedback information through the PUCCH on the same time domain resource (which may be slots or sub-slots), the AN is reported through the PUCCH by using the joint reporting mode on the above time domain resource.

Two codebooks may be cascaded or combined in an interleaving mode when a joint codebook is determined (see the background for details). In this process, an order needs to be determined. For example, for the cascade mode, the order determines the AN sequence of the PDSCH scheduled by which CORESET is the first, and the AN sequence of the PDSCH scheduled by which COREST is the second; and for the interleaving mode, the order determines the AN bits corresponding to each PDSCH transmitted on the same CC and time domain resource, the AN sequence of the PDSCH scheduled by which CORESET is the first, and the AN sequence of the PDSCH scheduled by which COREST is the second.

If a higher layer configures two H-IDs with different values (the ID configured by the higher layer for CORESET scheduling the PDSCH), in the process of determining the above order, the above H-IDs may be used to distinguish the order. For example, the AN sequence or AN bit corresponding to the CORESET for which the value of the H-ID is small is ahead.

If the higher layer configures two H-IDs with the same value, or does not configure the H-ID, the TRP order may be determined by using one of the following modes.

Mode 1: the TRP order is determined according to a size of a CORESET identifier (C-ID for short) corresponding to the DCI.

For example, the AN sequence or AN bit corresponding to the CORESET for which the value of the C-ID is small is ahead.

Mode 2: the TRP order is determined according to an instruction in the DCI.

For example, for the cascade mode, in any information field of the DCI, the CORESETs from different TRPs have different values, and the CORESETs from the same TRP have the same value. The AN sequence corresponding to the CORESET with a small indicated value is ahead; for the interleaving mode, in any information field of the DCI, the AN sequence corresponding to the DCI with a small indicated value is ahead.

Mode 3: for the interleaving mode, the order of the AN bit may be determined according to the time when the DCI is detected.

For example, the AN bit corresponding to the DCI detected first is ahead.

If the higher layer configures two H-IDs with the same value, or does not configure the H-IDs, a PUCCH resource indicated in one piece of DCI may be determined according to one of the following methods.

Method 1, the HARQ feedback information is reported according to a PUCCH resource indicated by the DCI sent in the last if the sending times of the respective DCI are different.

Method 2, a PUCCH resource indicated in one piece of DCI is determined according to the size of the C-ID to report the HARQ feedback information if the sending times of the respective DCI are the same. For example, a PUCCH resource indicated by the DCI in the CORESET with the largest C-ID is selected to report the HARQ feedback information.

If the network side indicates each PDSCH to report the AN through the PUCCH on different time domain resources, codebooks are independently generated and reported for each PDSCH according to the AN codebook generation mode of existing version Rel-15 (even if it is configured as joint reporting, the AN reporting of each PDSCH does not have to be gathered together, so there is little change to the existing specification).

2. If the network side configures the reporting mode as independent reporting, the terminal generates the respective codebooks of each ID according to the two different IDs configured by the higher layer, and reports through the respective PUCCHs of each ID.

In summary, referring to FIG. 1, at a terminal side, the embodiments of the present application provide an information communication method, including the following.

S101, an actual reporting mode of a PUCCH is determined according to a reported time domain resource and higher-layer configuration, where the actual reporting mode is a joint reporting mode or an independent reporting mode, and the higher-layer configuration includes indication information of a PUCCH reporting mode configured by a network side.

S102, the PUCCH is transmitted according to the reporting mode, where the PUCCH carries HARQ feedback information AN.

Through the method, the actual reporting mode of the PUCCH is determined according to the reported time domain resource and the higher-layer configuration, and the actual reporting mode is joint reporting or independent reporting; and the PUCCH is transmitted by using the reporting mode, and the PUCCH reporting mode is determined as joint reporting or independent reporting according to the time domain resource and the higher-layer configuration jointly, and the PUCCH is transmitted by using the determined reporting mode, to report the HARQ feedback information AN to the network side.

In one embodiment, the determining the actual reporting mode of the PUCCH according to the reported time domain resource and the higher-layer configuration, includes:

in a case that the network side configures the PUCCH reporting mode as joint reporting, and indicates the HARQ feedback information is reported through the PUCCH on the same time domain resource for multiple PDSCHs, reporting the HARQ feedback information through the PUCCH on the same time domain resource by using the joint reporting mode.

In one embodiment, in the process of reporting the HARQ feedback information through the PUCCH by using the joint reporting mode, the method further includes:

cascading two codebooks, or combining two codebooks in an interleaving mode in a case of determining a joint codebook; and in a case that a higher layer configures two H-IDs with different values, determining a feedback order of the HARQ feedback information by using the H-IDs; where the HARQ feedback information is HARQ feedback information of the PDSCH scheduled by a CORESET, and the H-IDs are identifiers configured by the higher layer for the CORESET scheduling the PDSCH.

In one embodiment, in a case that the higher layer configures two H-IDs with a same value, or does not configure an H-ID, a feedback order of the HARQ feedback information is determined by adopting one of (that is, the order of AN when feeding back information through the PUCCH is determined):

mode 1: determining the feedback order of the HARQ feedback information according to a size of a CORESET ID corresponding to DCI;

mode 2: determining the feedback order of the HARQ feedback information according to an instruction in the DCI; or mode 3: determining, for the interleaving mode, the feedback order of the HARQ feedback information according to the time when the DCI is detected.

In one embodiment, in a case that the higher layer configures two H-IDs with a same value, or does not configure an H-ID, then:

the HARQ feedback information is reported according to a PUCCH resource indicated by last DCI sent in a case that sending times of respective DCI are different; and a PUCCH resource indicated in one piece of DCI is determined according to a size of a CORESET ID to report the HARQ feedback information in a case that sending times of respective DCI are identical.

In one embodiment, the determining the actual reporting mode of the PUCCH according to the reported time domain resource and the higher-layer configuration, includes:

in a case that the network side configures the PUCCH reporting mode as joint reporting, and indicates the HARQ feedback information is reported through the PUCCH on different time domain resources for PDSCHs, independently generating and reporting a codebook for each PDSCH according to a codebook generation mode of the HARQ feedback information.

Figure 2:
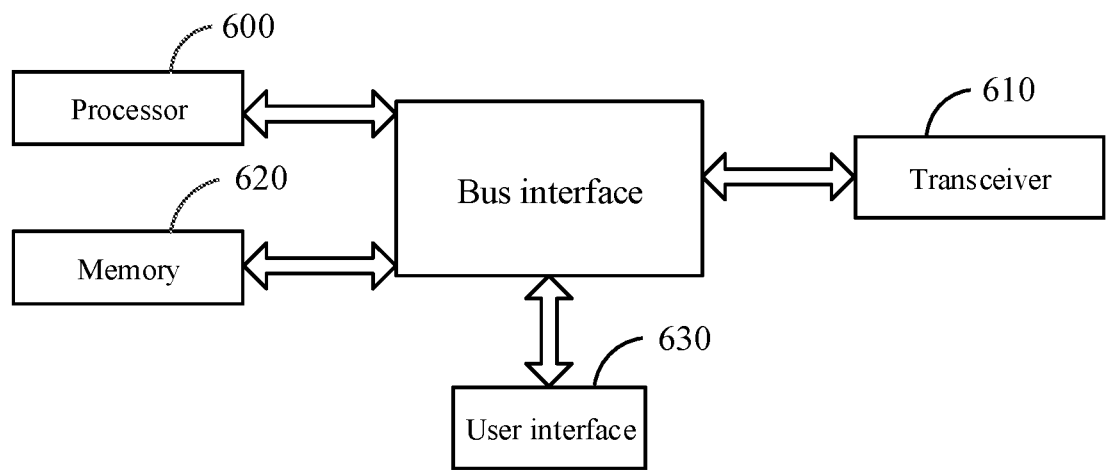
FIG. 2 is a structural schematic diagram of an information communication apparatus provided by embodiments of the present application.

Similarly, referring to FIG. 2, the embodiments of the present application provide an information communication apparatus, including:

a memory 620, configured to store program instructions; and a processor 600, configured to call the program instructions stored in the memory and execute according to the acquired programs:

determining an actual reporting mode of a PUCCH according to a reported time domain resource and higher-layer configuration, where the actual reporting mode is a joint reporting mode or an independent reporting mode, and the higher-layer configuration includes indication information of a PUCCH reporting mode configured by a network side; and transmitting the PUCCH according to the reporting mode, where the PUCCH carries HARQ feedback information.

In one embodiment, the processor is configured to execute:

in a case that the network side configures the PUCCH reporting mode as joint reporting, and indicates the HARQ feedback information is reported through the PUCCH on the same time domain resource for multiple PDSCHs, reporting the HARQ feedback information through the PUCCH on the same time domain resource by using the joint reporting mode.

In one embodiment, in a process of reporting the HARQ feedback information through the PUCCH by using the joint reporting mode, the processor is configured to execute:

cascading two codebooks, or combining two codebooks in an interleaving mode in a case of determining a joint codebook; and in a case that a higher layer configures two H-IDs with different values, determining a feedback order of the HARQ feedback information by using the H-IDs; where the HARQ feedback information is HARQ feedback information of the PDSCH scheduled by a CORESET, and the H-IDs are identifiers configured by the higher layer for the CORESET scheduling the PDSCH.

In one embodiment, in a case that the higher layer configures two H-IDs with the same value, or does not configure an H-IDs, a feedback order of the HARQ feedback information is determined by adopting one of:

mode 1: determining the feedback order of the HARQ feedback information according to a size of a CORESET ID corresponding to DCI;

mode 2: determining the feedback order of the HARQ feedback information according to an instruction in the DCI; or mode 3: determining, for the interleaving mode, the feedback order of the HARQ feedback information according to the time when the DCI is detected.

In one embodiment, in a case that the higher layer configures two H-IDs with the same value, or does not configure an H-ID, the processor is configured to execute the following:

the HARQ feedback information is reported according to a PUCCH resource indicated by last DCI sent in a case that sending times of respective DCI are different; or a PUCCH resource indicated in one piece of DCI is determined according to a size of a CORESET ID to report the HARQ feedback information in a case that sending times of respective DCI are the same.

In one embodiment, the processor is configured to execute:

in a case that the network side configures the PUCCH reporting mode as joint reporting, and indicates the HARQ feedback information is reported through the PUCCH on different time domain resources for PDSCHs, independently generating and reporting a codebook for each PDSCH according to a codebook generation mode of the HARQ feedback information.

A transceiver 610, configured to receive and transmit data under the control of the processor 600.

In FIG. 2, a bus architecture may include any quantity of interconnected buses and bridges, specifically one or more processors represented by the processor 600 and various circuits of the memory represented by the memory 620 are linked together. The bus architecture may also link various other circuits such as peripheral devices, voltage regulators and power management circuits, which are all known in the art, and therefore, no further description will be given herein. A bus interface provides an interface. The transceiver 610 may be various elements, that is, including a transmitter and a receiver, and provide a device for communicating with other apparatuses on a transmission medium. For different kinds of user equipment, a user interface 630 may also be an interface capable of connecting externally and internally with required devices, and the connected device includes but is not limited to a keypad, a display, a speaker, a microphone, a joystick, etc.

The processor 600 is responsible for managing the bus architecture and general processing, and the memory 620 can store data used by the processor 600 when performing operations.

In one embodiment, the processor 600 may be a center processing device (CPU), an application specific integrated circuit (ASIC), a field-programmable gate array (FPGA) or a complex programmable logic device (CPLD).

Figure 3:
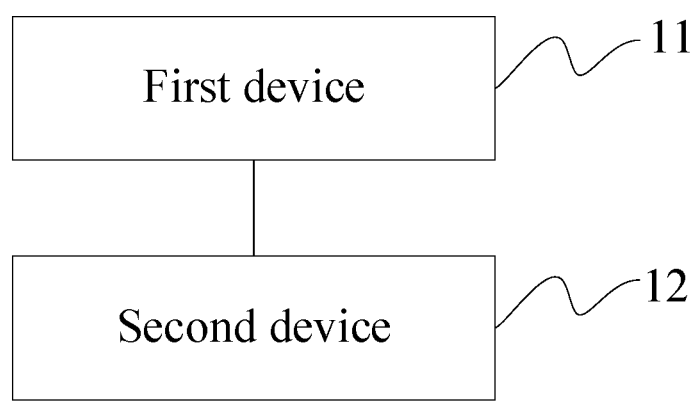
FIG. 3 is a structural schematic diagram of an information communication apparatus provided by embodiments of the present application.

Referring to FIG. 3, the embodiments of the present application provide another information communication apparatus, including:

a first device 11, configured to determine an actual reporting mode of a PUCCH according to a reported time domain resource and higher-layer configuration, where the actual reporting mode is a joint reporting mode or an independent reporting mode, and the higher-layer configuration includes indication information of a PUCCH reporting mode configured by a network side; and a second device 12, configured to transmit the PUCCH according to the reporting mode, where the PUCCH carries HARQ feedback information.

The devices in the embodiments can also implement all the processes of the method described in the above embodiments of the present application, which will not be repeated here.

It should be noted that the division of devices in the embodiments of the present application is illustrative, and is only a logical function division, and there may be other division methods in actual implementation. In addition, the functional devices in the various embodiments of the present application may be integrated into one processing device, or each device may exist alone physically, or two or more devices may be integrated in one device. The above integrated device may be implemented in the form of hardware or software functional device.

If the integrated device is implemented in the form of a software function device and sold or used as an independent product, it may be stored in a computer readable storage medium. Based on this understanding, the embodiments of the present application essentially or the part that contributes to the prior art or all or part of the disclosure can be embodied in the form of a software product, which is stored in a storage medium, including several instructions to make a computer device (which may be a personal computer, a server, or a network device, etc.) or a processor execute all or part of the steps of the methods described in the various embodiments of the present application. The aforementioned storage media include: a U disc, a mobile hard disc, a read-only memory (ROM), a random access memory (RAM), a magnetic disc or optical disc and other media that can store program codes.

The embodiment of the present application provides a computing device. The computing device specifically may be a desktop computer, a portable computer, a smart phone, a tablet computer, a PDA, etc. The computing device may include a CPU, a memory, an input/output device, etc., the input device may include a keyboard, a mouse, a touch screen, etc., and the output device may include a display device, such as a liquid crystal display (LCD) and a cathode ray tube (CRT).

The memory may include a ROM and a RAM, and provides the processor with program instructions and data stored in the memory. In the embodiments of the present application, the memory may be used to store programs of any of the methods provided in the embodiments of the present application.

The processor is configured to execute any of the methods provided by the embodiments of the present application according to the obtained programs by calling the program instructions stored in the memory.

The embodiment of the present application provides a computer storage medium for storing computer program instructions used by the apparatus provided by the embodiments of the present application, which includes a program for executing any of the methods provided by the embodiments of the present application.

The computer storage medium may be any available medium or data storage device to which the computer can have access, including but not limited to a magnetic memory (such as a floppy disc, a hard disc, a magnetic tape and a magneto-optical disc (MO)), an optical storage (such as a CD, a DVD, a BD and an HVD), and a semiconductor memory (such as an ROM, an EPROM, an EEPROM, a non-volatile memory (NAND FLASH) and a solid state drive (SSD)).

The method provided by the embodiments of the present application may be applied to a terminal device, and may also be applied to a network device.

The terminal device may also be called as UE, a mobile station (MS), a mobile terminal, etc. In one embodiment, the terminal may have the ability to communicate with one or more core networks via a RAN, for example, the terminal may be a mobile phone (or called a "cellular" phone) and a computer with mobile nature, for example, the terminal may also be a portable, pocket, handheld, computer-built-in or vehicle-mounted mobile device.

The network device may be a base station (such as an access point) which refers to device that communicates with a wireless terminal device through one or more sectors on an air interface in an access network. The base station may be used to convert received air frames and IP packets into each other, as a router between a wireless terminal and the rest of the access network, and the rest of the access network may include an IP network. The base station may also coordinate the attribute management of the air interface. For example, the base station may be a BTS in a GSM or a CDMA, a base station (NodeB) in a WCDMA, an evolved base station (NodeB or ENB or e-NodeB) in an LTE, or a gNB in a 5G system. There is no limitation in the embodiments of the present application.

The processing flow of the above method may be implemented by a software program, which may be stored in a storage medium, and when the stored software program is called, the above method steps are executed.

Based on the above, in the embodiments of the present application, whether to use a joint reporting mode or an independent reporting mode is determined according to the higher-layer configuration and the time domain resource jointly, and moreover, during joint reporting, the order of ACK/NACK information may further be determined, which makes little change to the existing specifications.

The embodiments of the present application may be provided as a method, a system, or a computer program product. Therefore, the present application may adopt the form of a complete hardware embodiment, a complete software embodiment, or an embodiment combining software and hardware. In addition, the present application may adopt the form of a computer program product implemented on one or more computer-usable storage media (including but not limited to a disc memory, an optical memory, etc.) containing computer usable program codes.

The present application is described with reference to the flow chart and/or block diagram of the method, device (system), and computer program product according to the embodiment of the present application. It should be understood that each process and/or block in the flow chart and/or block diagram and the combination of processes and/or blocks in the flow chart and/or block diagram can be realized by the computer program instructions. These computer program instructions can be provided to processors of a general-purpose computer, a special-purpose computer, an embedded processor or other programmable data processing devices to generate a machine, and the instructions executed by the processors of the computer or other programmable data processing devices generate a device for realizing the functions specified in one or more processes of the flow chart and/or one or more blocks of the block diagram.

These computer program instructions can also be stored in a computer-readable memory capable of guiding the computer or other programmable data processing devices to work in a specific mode, and the instructions stored in the computer-readable memory generate a manufacturing product including an instruction apparatus, and the instruction apparatus implements the functions specified in one or more processes of the flow chart and/or one or more blocks of the block diagram.

These computer program instructions can also be loaded on the computer or other programmable data processing devices, and a series of operation steps are performed on the computer or other programmable devices to generate computer implemented processing. Thus, the instructions executed on the computer or other programmable devices provide steps for implementing the functions specified in one or more processes of the flow chart and/or one or more blocks of the block diagram.

What is claimed is:

1. An information communication method, comprising:
determining an actual reporting mode of a physical uplink control channel (PUCCH) according to a reported time domain resource and higher-layer configuration, wherein the actual reporting mode is a joint reporting mode or an independent reporting mode, and the higher-layer configuration comprises indication information of a PUCCH reporting mode configured by a network side; and
transmitting the PUCCH according to the actual reporting mode, wherein the PUCCH carries hybrid automatic repeat request (HARQ) feedback information;
wherein the determining the actual reporting mode of the PUCCH according to the reported time domain resource and the higher-layer configuration, specifically comprises:
in a case that the PUCCH reporting mode is configured by the network side as joint reporting mode, and the HARQ feedback information being reported through the PUCCH on the same time domain resource for multiple physical downlink shared channels (PDSCHs) is indicated by the network side, reporting the HARQ feedback information through the PUCCH on a same time domain resource by using the joint reporting mode;
in a case that the PUCCH reporting mode is configured by the network side as joint reporting, and the HARQ feedback information being reported through the PUCCH on different time domain resources for the PDSCHs is indicated by the network side, independently generating and reporting a codebook for each of PDSCHs according to a codebook generation mode of the HARQ feedback information.

2. The method according to claim 1, wherein in a process of reporting the HARQ feedback information through the PUCCH by using the joint reporting mode, the method further comprises:
  determining a joint codebook by cascading two codebooks, or combining two codebooks in an interleaving mode; and
  determining a feedback order of the HARQ feedback information by using two higher-layer configuration identifiers (H-IDs), in a case that the two H-IDs with different values are configured by a higher layer;
  wherein the HARQ feedback information is HARQ feedback information of the PDSCH scheduled by a control resource set (CORESET), and the H-IDs are identifiers configured by the higher layer for the CORESET scheduling the PDSCH.

3. The method according to claim 2, wherein in a case that two H-IDs with a same value are configured by the higher layer, or no H-ID is configured, a feedback order of the HARQ feedback information is determined by adopting one of:
  determining the feedback order of the HARQ feedback information according to a size of a CORESET identifier (ID) corresponding to downlink control information (DCI);
  determining the feedback order of the HARQ feedback information according to an instruction in the DCI; or
  determining, for the interleaving mode, the feedback order of the HARQ feedback information according to a time when the DCI is detected.

4. The method according to claim 2, comprising: in a case that two H-IDs with a same value are configured by the higher layer, or no H-ID is configured:
  reporting the HARQ feedback information according to a PUCCH resource indicated by last DCI sent in a case that sending times of multiple DCIs are different; or
  determining a PUCCH resource indicated in one DCI of multiple DCIs according to a size of a CORESET ID to report the HARQ feedback information in a case that sending times of the multiple DCIs are identical.

5. An information communication apparatus, comprising:
  a memory, configured to store program instructions; and
  a processor, configured to call the program instructions stored in the memory and execute according to acquired programs:
  determining an actual reporting mode of a physical uplink control channel (PUCCH) according to a reported time domain resource and higher-layer configuration, wherein the actual reporting mode is a joint reporting mode or an independent reporting mode, and the higher-layer configuration comprises indication information of a PUCCH reporting mode configured by a network side; and
  transmitting the PUCCH according to the actual reporting mode, wherein the PUCCH carries hybrid automatic repeat request (HARQ) feedback information;
  wherein the determining the actual reporting mode of the PUCCH according to the reported time domain resource and the higher-layer configuration, specifically comprises:
  in a case that the PUCCH reporting mode is configured by the network side as joint reporting mode, and the HARQ feedback information being reported through the PUCCH on the same time domain resource for multiple physical downlink shared channels (PDSCHs) is indicated by the network side, reporting the HARQ feedback information through the PUCCH on a same time domain resource by using the joint reporting mode;
  in a case that the PUCCH reporting mode is configured by the network side as joint reporting, and the HARQ feedback information being reported through the PUCCH on different time domain resources for the PDSCHs is indicated by the network side, independently generating and reporting a codebook for each of PDSCHs according to a codebook generation mode of the HARQ feedback information.

6. The apparatus according to claim 5, wherein in a process of reporting the HARQ feedback information through the PUCCH by using the joint reporting mode, the processor is configured to execute:
  determining a joint codebook by cascading two codebooks, or combining two codebooks in an interleaving mode; and
  determining a feedback order of the HARQ feedback information by using two higher-layer configuration identifiers (H-IDs), in a case that the two H-IDs with different values are configured by a higher layer;
  wherein the HARQ feedback information is HARQ feedback information of the PDSCH scheduled by a control resource set (CORESET), and the H-IDs are identifiers configured by the higher layer for the CORESET scheduling the PDSCH.

7. The apparatus according to claim 6, wherein in a case that two H-IDs with a same value are configured by the higher layer, or no H-ID is configured, a feedback order of the HARQ feedback information is determined by adopting one of:
  determining the feedback order of the HARQ feedback information according to a size of a CORESET identifier (ID) corresponding to downlink control information (DCI);
  determining the feedback order of the HARQ feedback information according to an instruction in the DCI; or
  determining, for the interleaving mode, the feedback order of the HARQ feedback information according to a time when the DCI is detected.

8. The apparatus according to claim 6, wherein in a case that two H-IDs with a same value are configured by the higher layer, or no H-ID is configured, the processor is configured to execute:
  reporting the HARQ feedback information according to a PUCCH resource indicated by last DCI sent in a case that sending times of multiple DCIs are different; or
  determining a PUCCH resource indicated in one DCI of multiple DCIs according to a size of a CORESET ID to report the HARQ feedback information in a case that sending times of multiple DCIs are identical.

9. A non-volatile computer storage medium, wherein the non-volatile computer storage medium stores computer executable instructions which are configured to enable a computer to execute:
  determining an actual reporting mode of a physical uplink control channel (PUCCH) according to a reported time domain resource and higher-layer configuration, wherein the actual reporting mode is a joint reporting mode or an independent reporting mode, and the higher-layer configuration comprises indication information of a PUCCH reporting mode configured by a network side; and
  transmitting the PUCCH according to the actual reporting mode, wherein the PUCCH carries hybrid automatic repeat request (HARQ) feedback information;

wherein the determining the actual reporting mode of the PUCCH according to the reported time domain resource and the higher-layer configuration, specifically comprises:

in a case that the PUCCH reporting mode is configured by the network side as joint reporting mode, and the HARQ feedback information being reported through the PUCCH on the same time domain resource for multiple physical downlink shared channels (PDSCHs) is indicated by the network side, reporting the HARQ feedback information through the PUCCH on a same time domain resource by using the joint reporting mode;

in a case that the PUCCH reporting mode is configured by the network side as joint reporting, and the HARQ feedback information being reported through the PUCCH on different time domain resources for the PDSCHs is indicated by the network side, independently generating and reporting a codebook for each of PDSCHs according to a codebook generation mode of the HARQ feedback information.

10. The non-volatile computer storage medium according to claim 9, wherein in a process of reporting the HARQ feedback information through the PUCCH by using the joint reporting mode, the non-volatile computer storage medium stores computer executable instructions which are configured to enable a computer to execute:

determining a joint codebook by cascading two codebooks, or combining two codebooks in an interleaving mode; and determining a feedback order of the HARQ feedback information by using two higher-layer configuration identifiers (H-IDs), in a case that the two H-IDs with different values are configured by a higher layer;

wherein the HARQ feedback information is HARQ feedback information of the PDSCH scheduled by a control resource set (CORESET), and the H-IDs are identifiers configured by the higher layer for the CORESET scheduling the PDSCH.

11. The non-volatile computer storage medium according to claim 10, wherein in a case that two H-IDs with a same value are configured by the higher layer, or no H-ID is configured, a feedback order of the HARQ feedback information is determined by adopting one of:

determining the feedback order of the HARQ feedback information according to a size of a CORESET identifier (ID) corresponding to downlink control information (DCI);

determining the feedback order of the HARQ feedback information according to an instruction in the DCI; or determining, for the interleaving mode, the feedback order of the HARQ feedback information according to a time when the DCI is detected.

12. The non-volatile computer storage medium according to claim 10, wherein in a case that two H-IDs with a same value are configured by the higher layer, or no H-ID is configured, the non-volatile computer storage medium stores computer executable instructions which are configured to enable a computer to execute:

reporting the HARQ feedback information according to a PUCCH resource indicated by last DCI sent in a case that sending times of multiple DCIs are different; or determining a PUCCH resource indicated in one DCI of multiple DCIs according to a size of a CORESET ID to report the HARQ feedback information in a case that sending times of the multiple DCIs are identical.

* * * * *